Figure 1:
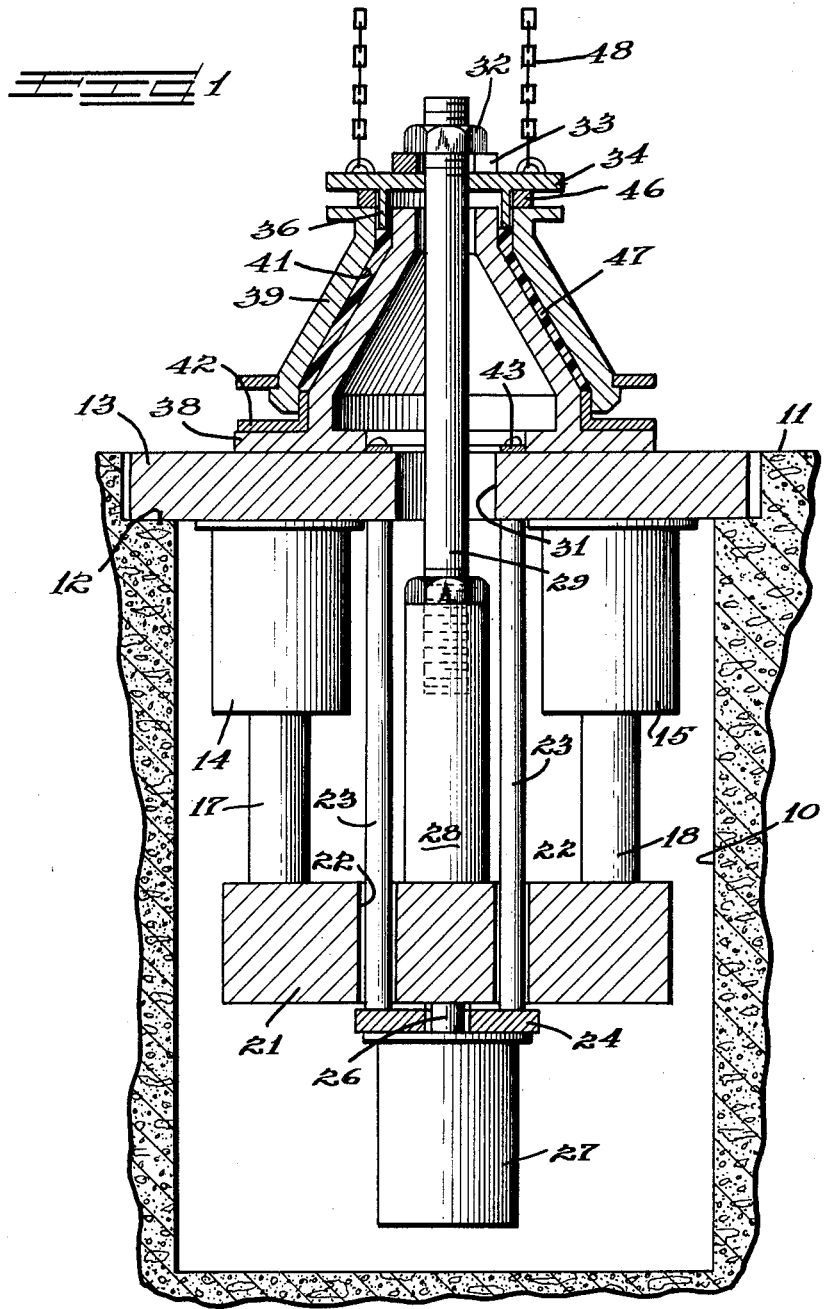

April 6, 1965   A. E. SCHMUCK ETAL   3,176,348
HYDRAULIC PRESS

Filed June 6, 1963   2 Sheets-Sheet 2

INVENTOR.
Albert E. Schmuck
Paul M. Gillespie
Cameron M. Smith
ATTORNEYS

United States Patent Office 3,176,348
Patented Apr. 6, 1965

3,176,348
HYDRAULIC PRESS
Albert E. Schmuck, Anaheim, Calif., and Paul M. Gillespie, Euclid, and Cameron M. Smith, South Russell, Ohio, assignors to Thompson Ramo Wooldridge Inc., Cleveland, Ohio, a corporation of Ohio
Filed June 6, 1963, Ser. No. 286,044
6 Claims. (Cl. 18—16)

The present invention relates to a hydraulic press assembly, and particularly to a molding press installation for applying high pressure to plastic materials.

To a large extent, the presses commonly used by the plastics industry for the hot pressing of high strength plastic components are modified injection molding presses or metal forming presses. Such installations require a great deal of room and are limited by physical considerations in the stroke available. Furthermore, the cost of handling the dies in conventional presses is an appreciable percentage of the cost of the finished product.

The molding press installation of the present invention is characterized by improved accessibility of the die structure for loading and assembly purposes which significantly reduces the handling costs which have heretofore been required. The arrangement is such that the pressure applying means are all located below floor level and only the die assembly itself, and a shaft assembly are positioned above floor level. The die assembly is, therefore, considerably more portable, resulting in significantly reduced costs in die handling apparatus. Furthermore, the problems of headroom which severely limited conventional press designs have been largely overcome by the installations of the present invention.

An object of the present invention is to provide an improved molding press installation which makes possible the use of relatively portable die structures.

Another object of the invention is to provide an improved molding press installation which conserves a great deal of floor space while providing substantially more headroom than available in conventional presses.

Still another object of the invention is to provide a hydraulically operated molding press which is considerably less expensive than conventional presses presently being used for the same purpose.

Still another object of the invention is to provide a hydraulic molding press installation which requires less power for its operation than presses heretofore used for similar purposes.

The molding press installation of the present invention includes a base plate which is located at substantially floor level. A shaft movable through the plate is provided to engage a separable molding die arranged to be positioned on the base plate at floor level. The engagement of the shaft with the die members causes molding pressure to be applied to the material within the molding cavity, the pressure being controlled by a hydraulic system which is disposed below the base plate. With the installation of the present invention, therefore, the bulk of the press assembly is located below floor level and only a relatively portable die assembly is located above the floor line. For this system it is, therefore, possible to move the die members from one location to another by means of an overhead crane of the like and a given hydraulic system can be used with a wide variety of different molds.

A further description of the present invention will be made in conjunction with the attached sheets of drawings which illustrate a preferred embodiment of the invention.

Figure 2:
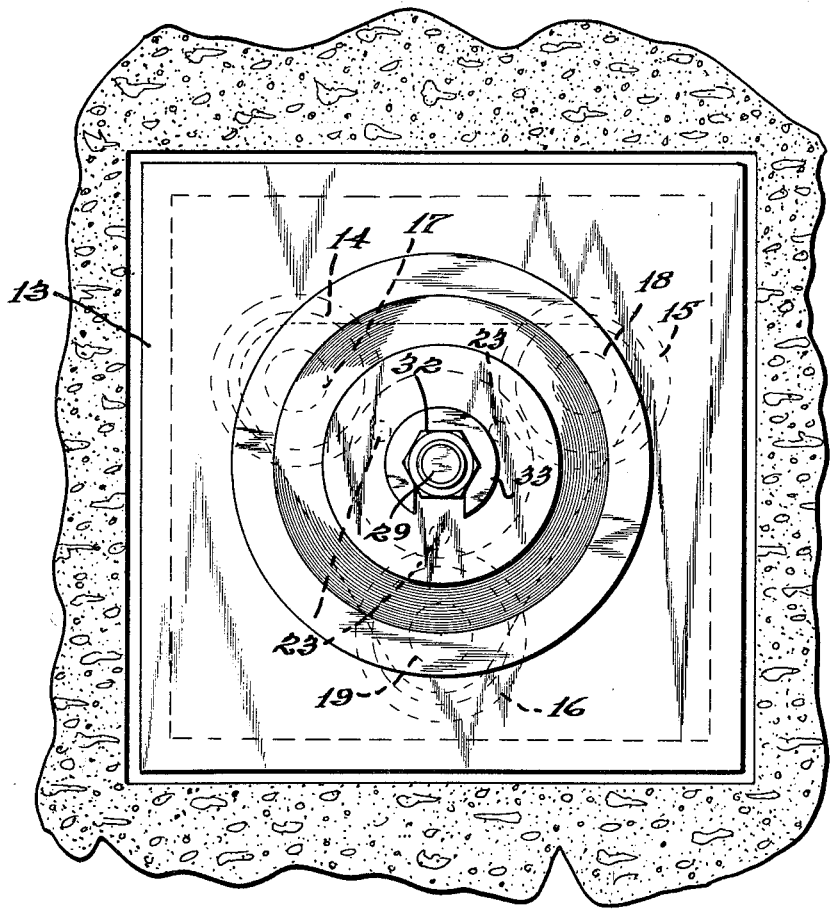

FIGURE 1 is a view partly in elevation and partly in cross-section illustrating the improved molding press of the present invention; and FIGURE 2 is a plan view of the assembly shown in FIGURE 1.

As shown in the drawings:

In FIGURE 1, reference numeral 10 indicates generally a pit which is formed below the floor line 11 of the molding room. The pit 10 is of sufficient length and depth so that it accommodates the entire hydraulic system for the molding press, and leaves room for servicing of the system.

The pit opening is formed with an annular shelf 12 on which is received a base plate 13, the top of the base plate 13 being substantially flush with the floor line 11.

The hydraulic system is supported by the base plate 13 and may include one or more hydraulic cylinders such as the spaced cylinders 14, 15 and 16. Rods 17, 18 and 19 are moved downwardly by the fluid pressure against the pistons in the cylinders 14, 15 and 16. The rods 17, 18 and 19 are secured to a floating collar 21 which is guided in its movement by the provision of apertures 22 through which are received guide rods 23. The upper ends of the guide rods 23 are secured to the base plate 13, the lower ends are secured to a centrally apertured disc 24, as best seen in FIGURE 1.

The collar 21 is also secured to a shaft 26 extending from a double acting cylinder 27 which is preferably of the rapid traverse type. In downward movement of the collar 21, the single acting cylinders 14, 15 and 16 as well as the double acting cylinder 27 provide the pressure required to mold the material in the molding cavity.

The collar 21 carries a ram 28 having an internally threaded portion which receives a shaft 29 in threaded engagement therein. The shaft 29 is arranged to reciprocate to apply and release the pressure in the molding die assembly. The shaft 29 is free to move through a centrally disposed aperture 31 of the base plate 13.

The upper end of the shaft 29 is threaded and receives a locking nut 32, a C washer 33 and a cross head 34. The cross head 34 has an integral annular collar 36 depending therefrom which serves to locate the cross head properly with respect to the mating die members.

The die itself consists of a male member 38 and a female member 39 which define a molding cavity 41 therebetween. A seal 42 is provided between the male and female die members at their lower extremities to seal off the cavity at one end.

The male die member 38 may be properly oriented with respect to the remainder of the assembly by the provision of a locating plug 43 on the base plate 13. In addition, the male die member, if desired, may be temporarily bolted or otherwise secured to the base plate 13 during molding.

The engagement of the nut 32 and the washer 33 with the cross head 34 presses down on a spacer collar 46 disposed between the cross head 34 and the female die member 39. Pressure is thereupon applied to the molding cavity 41 and to plastic material 47 which is contained therein. While the invention is applicable to the molding of any type of plastic material, including particulate plastics, it finds particular utility in the molding of compositions such as silica or asbestos impregnated with resins.

The design of the components is such that they can be readily moved from place to place as by means of an overhead crane, the chain of which is illustrated at reference 48 of the drawings. After the molding cavity 46 is filled with the plastic material 47, the hydraulic system is energized causing the single acting cylinders 17, 18, and 19, in cooperation with the double acting cylinder 27 to move the collar 21 downwardly and thereby act through the shaft 29, the nut 23, the washer 33, the cross head 34, and the spacer collar 46 to apply pressure to the material 47 in the molding cavity. Due to the configuration of the molding elements, a relatively short stroke is required in this compression step. After completion of the molding (the female die member 39 may be heated for this purpose) the molding pressure is released by the operation of the double acting cylinder 27. The force required for the release of molding pressure and the traverse is small, so that the power required for release of the molding members is very small compared to that of a conventional press of comparable capacity. The mold can then be disassembled by removing the nut 32 and the washer 33, and lifting the molding components from about the shaft 29. Thus, the hydraulic system can be used with various types of mold designs of various sizes and configurations simply by using different sized shafts 29, if necessary.

It should be evident that various modifications can be made to the described embodiments without departing from the scope of the present invention.

We claim as our invention:

1. A molding press installation comprising a base plate at substantially floor level, a shaft movable through said plate, a pair of separable molding elements engageable by said shaft, positioning means on said base plate for locating one of said elements on said base plate, and a hydraulic system disposed below said base plate and operating said shaft to apply molding pressure to material contained within said separable molding elements.

2. A molding press installation comprising a base plate at substantially floor level, a shaft movable through said plate, a pair of separable molding elements fitting over said shaft, means for releasably engaging said molding elements with said shaft, and a hydraulic system disposed below said base plate and operating said shaft to apply molding pressure to material contained within said separable molding elements.

3. A molding press installation comprising a base plate at substantially floor level, a shaft movable through said plate, a pair of separable molding elements engageable by said shaft, positioning means on said base plate for locating one of said elements on said base plate, and a hydraulic system disposed below said base plate, said hydraulic system including a collar secured to said shaft, a plurality of downwardly acting hydraulic cylinders engaging said collar to apply a molding pressure to said die, and a return cylinder carried by said collar and connected to said shaft to relieve said molding elements of molding pressure.

4. The installation of claim 3 in which said return cylinder is a double acting cylinder.

5. The installation of claim 3 in which said return cylinder is a rapid traverse cylinder.

6. A molding press installation comprising an apertured base plate at substantially floor level, a shaft movable through the aperture in said plate, a pair of separable molding elements, locating means on said base plate for positioning said molding elements coaxially with respect to the aperture in said base plate, means for coupling said shaft to one of said molding elements to apply molding pressure thereto, a collar coupled to one end of said shaft and disposed below said base plate, first hydraulic means acting on said collar to force said shaft downwardly and thereby apply molding pressure to the material contained between said molding elements, and second hydraulic means including a rapid traverse cylinder coupled to said collar and arranged to move said shaft upwardly and thereby release molding pressure from said molding elements.

References Cited by the Examiner
UNITED STATES PATENTS

| 2,707,307 | 5/55 | Brumbach | 18—16 |
| 2,825,092 | 3/58 | Hatch et al. | 18/16.7 |
| 3,008,189 | 11/61 | Harvey | 18—30 |
| 3,044,119 | 7/62 | Poulin | 18—30 |
| 3,047,929 | 8/62 | Steiro | 25—30 XR |
| 3,067,457 | 12/62 | Dennis et al. | 18—18 XR |

MICHAEL V. BRINDISI, *Primary Examiner.*

WILLIAM J. STEPHENSON, *Examiner.*